(12) United States Patent
Padmanabhan et al.

(10) Patent No.: US 10,083,340 B2
(45) Date of Patent: Sep. 25, 2018

(54) AUTOMATED CELL SEGMENTATION QUALITY CONTROL

(71) Applicant: GE Healthcare Bio-Sciences Corp., Marlborough, MA (US)

(72) Inventors: Raghav Krishna Padmanabhan, Aliso Viejo, CA (US); Edward John Moler, Aliso Viejo, CA (US); Yousef Al-Kofahi, Niskayuna, NY (US); Alberto Santamaria-Pang, Niskayuna, NY (US); Brion Daryl Sarachan, Niskayuna, NY (US); Qing Li, Niskayuna, NY (US)

(73) Assignee: GE Healthcare Bio-Sciences Corp., Marlborough, MA (US)

( * ) Notice: Subject to any disclaimer, the term of this patent is extended or adjusted under 35 U.S.C. 154(b) by 79 days.

(21) Appl. No.: 15/006,959

(22) Filed: Jan. 26, 2016

(65) Prior Publication Data

US 2017/0213067 A1 Jul. 27, 2017

(51) Int. Cl.
*G06K 9/00* (2006.01)
*G06K 9/32* (2006.01)
*G06T 7/00* (2017.01)
*G06K 9/62* (2006.01)

(52) U.S. Cl.
CPC ......... *G06K 9/0014* (2013.01); *G06K 9/3241* (2013.01); *G06K 9/6262* (2013.01); *G06T 7/0081* (2013.01); *G06T 2207/20081* (2013.01); *G06T 2207/30024* (2013.01); *G06T 2207/30168* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 6,033,853 A * | 3/2000 | Delair | ..... | C12Q 1/682 435/6.1 |
| 7,524,674 B2 * | 4/2009 | Gambhir | ..... | A01K 67/0271 424/192.1 |
| 8,639,013 B2 * | 1/2014 | Kenny | ..... | G01N 21/643 382/133 |
| 8,824,769 B2 * | 9/2014 | Sarachan | ..... | G06F 19/18 382/133 |
| 2008/0216185 A1 * | 9/2008 | Chesnut | ..... | C12N 15/1082 800/21 |

(Continued)

*Primary Examiner* — Nancy Bitar

(57) ABSTRACT

The disclosed subject matter relates to an automated determination of cell-by-cell segmentation quality of a tissue specimen sample. A training set of cells is examined by an expert to determine which cells that include "good" segmentation and which cells include "poor" segmentation. A training model is build based on the image data of the cells in the training set. Image data from cells in a test specimen is obtained and that image data is compared to the training model to determine on a cell-by-cell basis which cells in the test specimen include "good" segmentation and which cells include "poor" segmentation. The accumulated data on the cells analyzed in the test specimen can be utilized to determine an overall segmentation quality score for the area of the test specimen in which the individual cells are located in the test specimen.

20 Claims, 13 Drawing Sheets
(6 of 13 Drawing Sheet(s) Filed in Color)

(56) References Cited

U.S. PATENT DOCUMENTS

| | | | | |
|---|---|---|---|---|
| 2009/0137023 A1* | 5/2009 | Casutt | ................... | C12N 5/16 |
| | | | | 435/235.1 |
| 2011/0091081 A1* | 4/2011 | Sarachan | ............. | C12Q 1/6881 |
| | | | | 382/128 |
| 2013/0287283 A1* | 10/2013 | Kamath | ................ | G09G 5/026 |
| | | | | 382/133 |
| 2014/0314299 A1* | 10/2014 | Santamaria-Pang | ........................ | |
| | | | | G06K 9/0014 |
| | | | | 382/133 |
| 2015/0133321 A1* | 5/2015 | Bhaumik | ......... | G01N 33/57492 |
| | | | | 506/9 |

* cited by examiner

US 10,083,340 B2

AUTOMATED CELL SEGMENTATION QUALITY CONTROL

BACKGROUND

The subject matter disclosed herein generally relates to analyzing the expression of biomarkers in cells that are examined in situ in their tissue of origin. More particularly, the disclosed subject matter relates to an automated determination of cell-by-cell segmentation quality of a tissue sample.

The expression of biomarkers in cells and tissues has been an important technique for biological and medical research relating to, for example, drug development, disease pathways, tissue pathology and clinical studies. Available biomarkers allow for the determination of (1) a specific cell or components of a cell such as cytoplasm, membrane or nucleus or (2) the morphology of a cell including, for example, identifying the shape, structure, form, and size of a cell, both based on the level of expression of a given biomarker. Historically, tissue treated with several biomarkers that each emanates different signals has been analyzed using digital imagery. However, more recently, techniques have been developed that allow for the examination of a single specimen using a greater number of biomarkers, thus providing more information and data available for analysis. Sequential multiplexing techniques involve staining a specimen using a fluorophore labeled probe to indicate the expression of one or more probe bound biomarkers, chemically bleaching the specimen and re-staining the specimen with a different probe bound biomarker. A probe bound biomarker may also be referred to as a "biomarker."

Sequential multiplexing technology used, for example, in the GE Healthcare MultiOmyx™ platform has enabled researchers to perform studies in which a large number of biomarkers (60+) can be analyzed at the cell level. Such technology allows a single tissue sample to be examined and data collected sequentially using different biomarkers.

The analysis of a typical multiplexing study may take several weeks to months depending on the sample size and number of biomarkers used. As part of the process, cell segmentation accuracy can significantly affect the quality of the subsequent biomarker quantification and data analysis. For example, FIGS. 1A and 1B show subcellular distributions (blue: nuclear, green: cytoplasm, red: membrane) of a cytoplasmic marker (HSP90) image using the GE Healthcare MultiOmyx™ platform. FIG. 1A illustrates the distribution when including all of the cells in the image and FIG. 1B illustrates the distribution after applying cell filtering based on the cell size and the presence of a nucleus (i.e. cells with no nuclei were removed). The cell filtering in FIG. 1B improves the localization of the biomarker by increasing the disparity between cytoplasm, membrane and nuclear distributions. Cell raw and segmentation images using structural biomarkers, for example, are shown in FIGS. 2A-2D using the GE Healthcare MultiOmyx™ platform. FIG. 2A is a low resolution image of an input composite raw image showing three channels of biomarkers for nucleus, membrane and cytoplasm and FIG. 2B is a higher resolution of the composite raw image of FIG. 2A. The composite raw image is the assembly of the three visual images of the three separately biomarker stained tissue sample and may also be referred to as a multi-channel or multi-color raw image. FIG. 2C is a low resolution image of an output composite segmentation image showing cell boundaries in white as well as blue, green and red that represent the cell nuclear, cytoplasm and membrane compartments, respectively as determined by such biomarkers and FIG. 2D is a higher resolution of the composite segmentation image of FIG. 2C. A composite segmentation image is the result of an analyzer, such as a MultiOmyx™ system, analyzing the composite raw image and visually identifying the cell segments of the tissue sample in the composite raw image. A composite segmentation image may also be referred to as a multi-channel or multi-color segmentation image. When zooming in to the cell level (as shown in the higher resolution images of FIG. 2B and FIG. 2D), it becomes clear that the segmentation is "poor" for some of the cells by showing image errors present for those cells with "poor" segmentation that would be evident to an expert such as, for example, a pathologist or cell biologist. Performing a manual cell-by-cell segmentation review is one method of reducing such errors, but it is time consuming and tiring for the person doing the review.

BRIEF DESCRIPTION

In one embodiment, a method for determining the quality of cell segmentation of a marker stained biological specimen is provided. The method includes building a training model including obtaining training image feature data for a plurality of segmentation marker stained training cells, the training image feature data including a plurality of cell features for each cell in the plurality of segmentation marker stained training cells; examining visually by an expert each cell in the plurality of segmentation marker stained training cells to determine which cells in the plurality of segmentation marker stained training cells include "good" segmentation; isolating the training image feature data for each cell included in the plurality of segmentation marker stained training cells that include "good" segmentation; creating an training image feature vector from the training image feature data for each cell included in the plurality of segmentation marker stained training cells that include "good" segmentation, the number of dimensions of the training image feature vector depending on the number of cell features in the plurality of cell features for each cell in the plurality of segmentation marker stained training cells; and creating the training model using the training image feature vector for each cell included in the plurality of segmentation marker stained cells that include "good" segmentation to define a hyper-sphere such that a cell with an image vector that is on the boundary of or inside the hyper-sphere includes "good" segmentation and a cell with an image vector that is outside the hyper-sphere includes "poor" segmentation. The method further includes obtaining test image feature data for at least one segmentation marker stained test cell from the marker stained biological specimen, the test image feature data including a plurality of cell features for the at least one segmentation marker stained test cell; isolating the test image feature data for the at least one segmentation marker stained test cell; creating an test image feature vector from the test image feature data for the at least one segmentation marker stained test cell, the number of dimensions of the test image feature vector for the at least one segmentation marker stained test cell depending on the number of cell features in the plurality of cell features for the at least one segmentation marker stained test cell; and determining whether the test image feature vector of the at least one segmentation marker stained test cell is on the boundary of, inside or outside the hyper-sphere of the training model, the image vector being on the boundary of or inside the hyper-sphere indicating that the at least one segmentation marker stained test cell includes "good" segmentation and the image vector being outside the hyper-sphere indicating that the at least one segmentation marker stained test cell includes "poor" segmentation.

In another embodiment, a system for assessing the quality of a segmentation marker stained biological specimen is provided. The system includes an imager configured to acquire and process image data of a biological specimen, an A/D converter; an image acquisition and analysis system configured to process the image data into processed image data; and a memory. The imager includes a stage configured to support a biological specimen, an illumination source configured to emit electromagnetic energy, a detector system including a detector configured to detect electromagnetic energy reflected or emitted from the biological specimen resulting from exposure to the electromagnetic energy from the illumination source, and an optical system configured to direct the electromagnetic energy from the illumination source toward the biological specimen and direct electromagnetic energy from the biological specimen toward the detector and a workstation including a display. The memory is configured to store instructions for building a training model including obtaining at least one image of a plurality of segmentation marker stained training cells using the imager, converting the at least one image of the plurality of segmentation marker stained training cells to training image feature data for the plurality of segmentation marker stained training cells using the A/D converter, the training image feature data including a plurality of cell features for each cell in the plurality of segmentation marker stained training cells, displaying using the workstation the training image feature data for an expert, receiving from the expert using the workstation information a designation of which cells in the plurality of segmentation marker stained training cells include "good" segmentation, isolating the training image feature data for each cell included in the plurality of segmentation marker stained training cells that include "good" segmentation, creating an training image feature vector from the training image feature data for each cell included in the plurality of segmentation marker stained training cells that include "good" segmentation, the number of dimensions of the training image feature vector depending on the number of cell features in the plurality of cell features for each cell in the plurality of segmentation marker stained training cells, and creating the training model using the training image feature vector for each cell included in the plurality of segmentation marker stained cells that include "good" segmentation to define a hyper-sphere such that a cell with an image vector that is on the boundary of or inside the hyper-sphere includes "good" segmentation and a cell with an image vector that is outside the hyper-sphere includes "poor" segmentation. The memory is also configured to store instructions for determining whether a segmentation marker stained test cell from the marker stained biological specimen includes "good" segmentation or "poor" segmentation including obtaining at least one image of at least one segmentation marker stained test cell using the imager, converting the at least one image of the at least one segmentation marker stained test cell to test image feature data for the at least one segmentation marker stained test cell using the A/D converter, the test image feature data including a plurality of cell features for the at least one segmentation marker stained test cell, isolating the test image feature data for the at least one segmentation marker stained test cell, creating an test image feature vector from the test image feature data for the at least one segmentation marker stained test cell, the number of dimensions of the test image feature vector for the at least one segmentation marker stained test cell depending on the number of cell features in the plurality of cell features for the at least one segmentation marker stained test cell and determining whether the test image feature vector of the at least one segmentation marker stained test cell is on the boundary of, inside or outside the hyper-sphere of the training model, the image vector being on the boundary of or inside the hyper-sphere indicating that the at least one segmentation marker stained test cell includes "good" segmentation and the image vector being outside the hyper-sphere indicating that the at least one segmentation marker stained test cell includes "poor" segmentation.

In another embodiment, a method for determining the quality of cell segmentation of a marker stained biological specimen with an imager configured to acquire and process image data of a biological specimen is provided, the imager including a stage configured to support the biological specimen, an illumination source configured to emit electromagnetic energy, a detector system including a detector configured to detect electromagnetic energy reflected or emitted from the biological specimen resulting from exposure to the electromagnetic energy from the illumination source, an optical system configured to direct the electromagnetic energy from the illumination source toward the biological specimen and direct electromagnetic energy reflected or emitted from the biological specimen toward the detector, a data analysis system, and a workstation including a display. The method includes building a training model including obtaining training image feature data where the biological specimen is a plurality of segmentation marker stained training cells, the training image feature data including a plurality of cell features for each cell in the plurality of segmentation marker stained cells, including positioning the plurality of segmentation marker stained training cells on the stage, illuminating the plurality of segmentation marker stained training cells using the illumination source, detecting the light reflected or emitted from the plurality of segmentation marker stained training cells using the detector system and converting the detected the light reflected or emitted from the plurality of segmentation marker stained training cells to the training image feature data by the data analysis system. Building the training model also includes examining the training image feature data visually by an expert using the workstation display each cell in the plurality of segmentation marker stained training cells to determine which cells in the plurality of segmentation marker stained training cells include "good" segmentation, identifying by the expert using the workstation each cell in the plurality of segmentation marker stained training cells that includes "good" segmentation, isolating the training image feature data for each cell included in the plurality of segmentation marker stained training cells that include "good" segmentation using the data analysis system, creating an training image feature vector from the training image feature data for each cell included in the plurality of segmentation marker stained training cells that include "good" segmentation using the data analysis system, the number of dimensions of the training image feature vector depending on the number of cell features in the plurality of cell features for each cell in the plurality of segmentation marker stained training cells and creating the training model using the data analysis system from the training image feature vector for each cell included in the plurality of segmentation marker stained cells that include "good" segmentation to define a hyper-sphere such that a cell with an image vector that is on the boundary of or inside the hyper-sphere includes "good" segmentation and a cell with an image vector that is outside the hyper-sphere includes "poor" segmentation. The method further includes obtaining specimen image feature data where the biological specimen is at least one segmentation marker stained test cell from the marker stained biological specimen, the image feature data including a plurality of cell features for the at least one segmentation marker stained test cell, including positioning the at least one segmentation marker stained test cell on the stage, illuminating the at least one segmentation marker stained test cell using the illumination source, detecting the light reflected or emitted from the at least one segmentation marker stained test cell using the detector system and converting the detected the light reflected or emitted from the at least one segmentation marker stained test cell to the specimen image feature data by the data analysis system. The method continues and includes isolating the specimen image feature data for the at least one segmentation marker stained test cell using the data analysis system, creating a specimen image feature vector from the specimen image feature data for the at least one segmentation marker stained test cell using the data analysis system, the number of dimensions of the specimen image feature vector for the at least one segmentation marker stained test cell depending on the number of cell features in the plurality of cell features for the at least one segmentation marker stained test cell and determining using the data analysis system whether the specimen image feature vector of the at least one segmentation marker stained test cell is on the boundary of, inside or outside the hyper-sphere of the training model, the specimen image vector being on the boundary of or inside the hyper-sphere indicating that the at least one segmentation marker stained test cell includes "good" segmentation and the specimen image vector being outside the hyper-sphere indicating that the at least one segmentation marker stained test cell includes "poor" segmentation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present invention will become better understood when the following detailed description is read with reference to the accompanying drawings in which like characters represent like parts throughout the drawings, wherein.

DETAILED DESCRIPTION

Figure 1A:
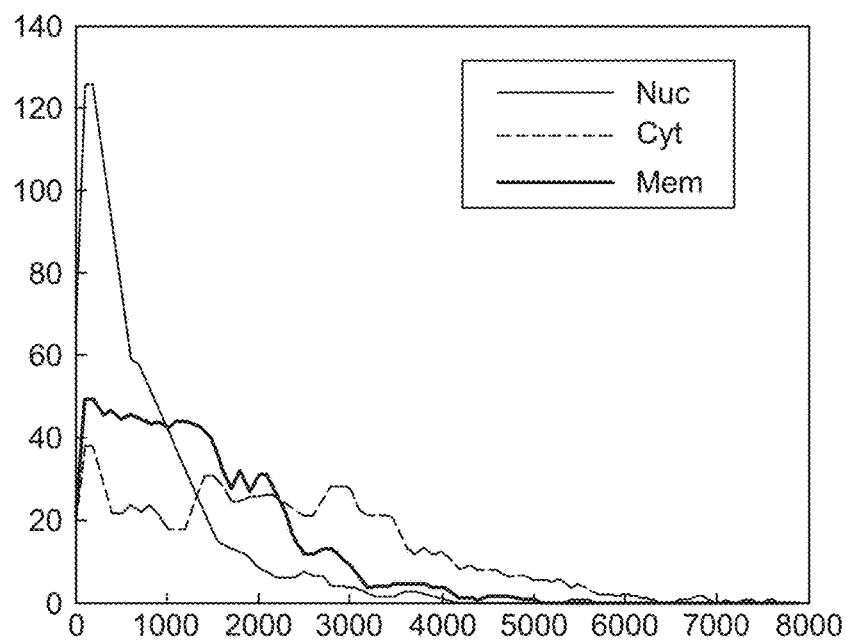
FIG. 1A illustrates the subcellular image data of a distributions of cells in an image.
Figure 1B:
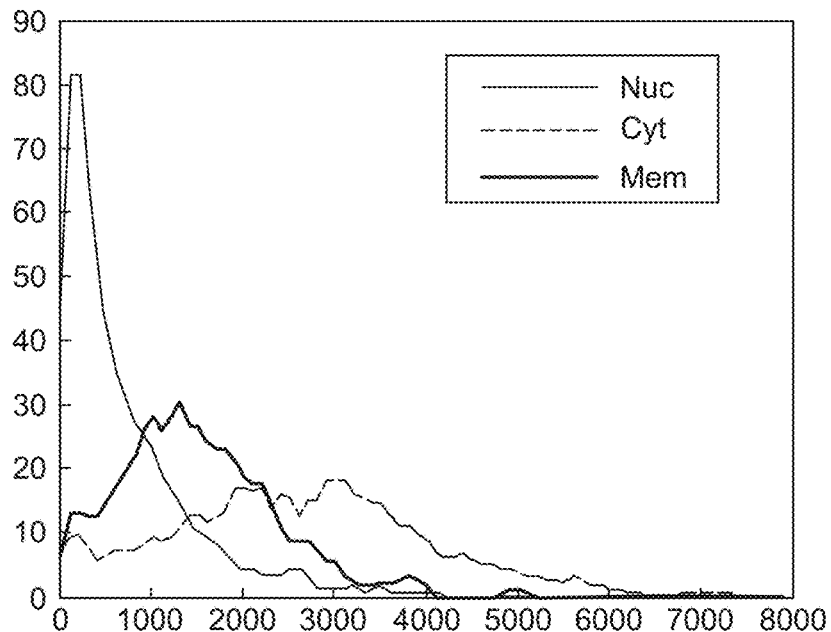
FIG. 1B illustrates the distribution shown in FIG. 1A after applying cell filtering to the image data.
Figure 2A:
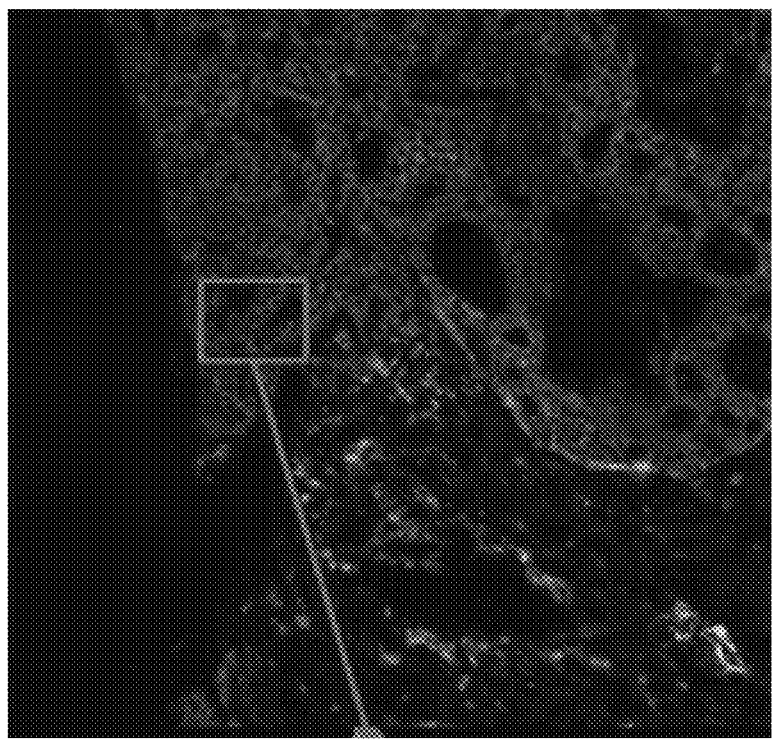
FIG. 2A is a low resolution image of an input composite raw image showing three channels of biomarkers.
Figure 2B:
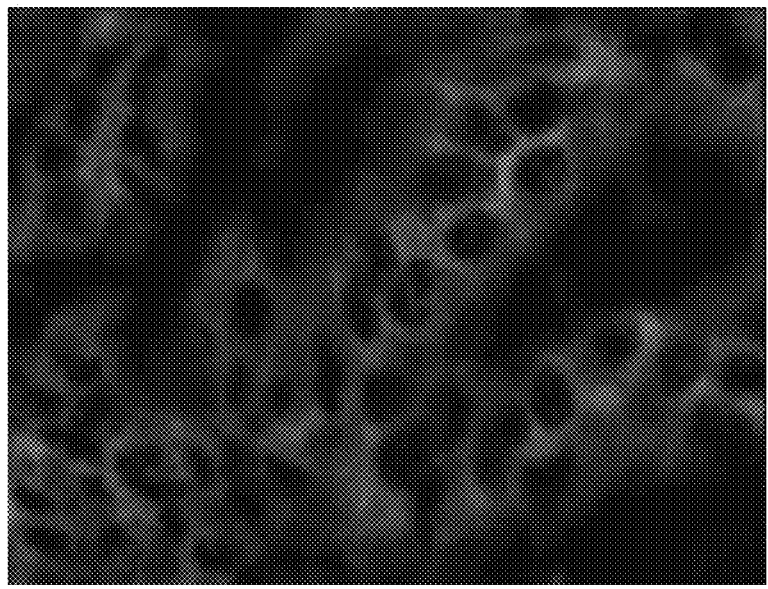
FIG. 2B is a higher resolution image of the input composite raw image of FIG. 2A.
Figure 2C:
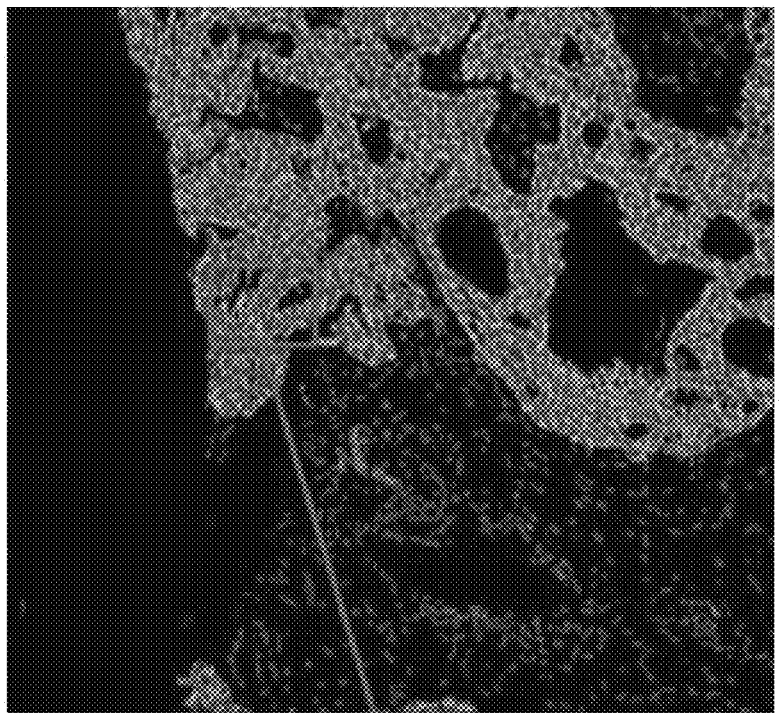
FIG. 2C is a low resolution image of an output composite segmentation image of the image in FIG. 2A.
Figure 2D:
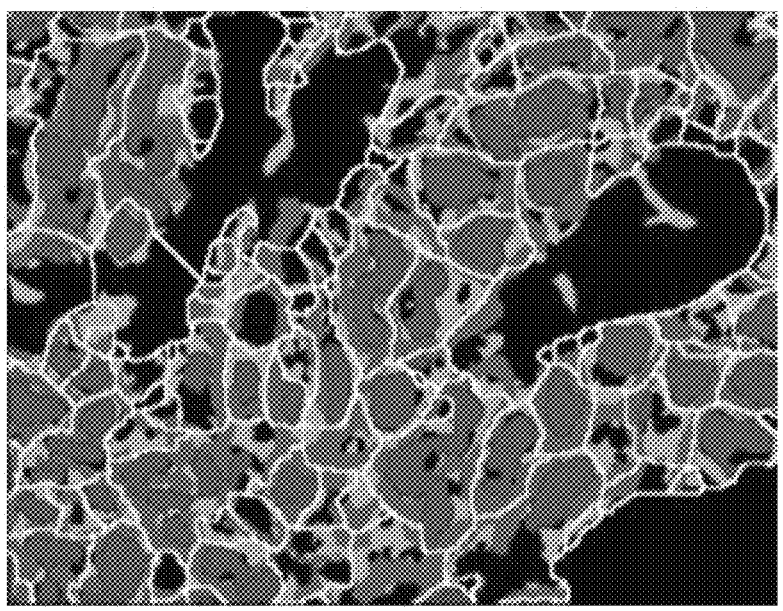
FIG. 2D is a higher resolution image of the output composite segmentation image of FIG. 2C.

The present disclosure relates to determining the quality of a specimen on a cell-by-cell basis undergoing multiplexing biomarker analysis using, for example, the GE Healthcare MultiOmyx™ platform. In one embodiment, the disclosed embodiments may be used to determine a cell-by-cell segmentation quality score as well as an overall image segmentation quality score based on the segmentation quality score of the cells in the image. "Poor" cell segmentation includes biomarker image data where differentiation between nucleus, membrane and cytoplasm is such that there is significant enough overlap among the three biomarkers in portions of a cell so that it may be less clear whether those portions are nucleus, membrane or cytoplasm, as exemplified in FIG. 1A.

System benefits and improvements of the embodiments of the present disclosure include the following: (1) reducing system computation and analysis time that enables faster scale-up for studies, particularly very large studies, as a result of, for example, its use in a high-throughput commercial business environment; (2) increasing system accuracy by reducing errors including miss-identification of, for example, cells and cell segments that may degrade the quality of the analytical results of, for example, cell and tissue samples; and (3) reducing human subjectivity and observer to observer variability, which improves the repeatability and reliability of the results. As a result of the above, the embodiments address system problems encountered in analyzing biomarker images and the technical field of biomarker image system analysis.

Embodiments of the present disclosure may be performed in situ, including, for example, in intact organ or tissue or in a representative segment of an organ or tissue. In situ analysis can include cells obtained from various sources, including an organism, an organ, tissue sample, or a cell culture. Analysis thereof may provide specimen data that is difficult to obtain should the cells be removed from their biological surroundings. Acquiring such may not be possible should the cells within the specimen be disturbed from their natural tissue milieu.

As used herein, the terms "specimen," "biological specimen," "biological material," or "biological sample" refers to material obtained from, or located in, a biological subject, including biological tissue or fluid obtained from a subject, including, but are not limited to, body fluid (e.g., blood, blood plasma, serum, or urine), organs, tissues, biopsies, fractions, and cells isolated from, or located in, any biological system, such as mammals Specimens, biological specimens, biological samples and/or biological materials also may include sections of a biological sample, specimens or materials including tissues (e.g., sectional portions of an organ or tissue) and may also include extracts from a biological sample, for example, an antigen from a biological fluid (e.g., blood or urine). The specimens, biological specimens, biological samples and/or biological materials may be imaged as part of a slide.

The present disclosure includes embodiments involving systems and methods for biological specimen image analysis including those that may be used to analyze images from a physical sample or previously acquired images, for example, digitally stored images. In other embodiments, the images may be acquired from a physical sample. An exemplary imaging system may include an imager that detects signals and converts the signals to data that may be processed by system processors. The imager creates image data indicative of a biological specimen in a conventional medium, such as photographic film, or in a digital medium. The imager may utilize various physical principles and components for creating the derived image data including, for example, a fluorescent microscope, a bright field microscope, or devices adapted for suitable imaging modalities. The imager may include a stage, an illumination or light source system, an optical system and a detector system. The stage, sample holder is a structure on which a specimen is positioned including, for example, a moveable X-Y stage, such as a motorized X-Y stage to maneuver the specimen to different positions on the stage. The illumination or light source system may include a visible light source, a fluorescent light source or sources of other wavelengths in the electromagnetic spectrum and may include lasers. The optical system may magnify, direct and/or focus the light source on the specimen as well as magnify, direct and/or focus light emitting from the specimen, including its visible image or fluorescent image, toward a detector included in the detector system. The detector system can be connected and operated in conjunction with other imager systems. The optical system may include lenses as well as other optical components such as beam splitters, mirrors and filters. The filters may be used to select a wavelength or band of wavelengths of light from the illumination or light source to be focused on the specimen positioned on the stage. The illumination or light source system (optionally in cooperation with a filter included in the optical system) illuminates, irradiates or excites the specimen or portions thereof including fluorescent biomarkers bound thereto so that light reflected by the specimen or emitted by a fluorescent moiety tagged biomarker bound to the specimen can be directed and focused onto the detector. The detector system and detector included therein may be connected to an A/D converter to convert the acquired data or signal to digital values that may then be provided to a data acquisition system to record, store and/or manipulate the detected image of the specimen. The detector system including the detector may measure wavelengths of the light reflected or fluorescence emitted and detects the intensities and location of the reflected light or fluorescence emitted from the specimen. The imager may also include various vibration or shock reducing components to reduce or isolate the imager or components thereof from external vibration or other external movement that could affect operation of the imager. The imager may also include a specimen handling apparatus to physically deliver specimens to the stage for analysis using mechanical means such as motorized belts or arms.

The imager may operate under the control of a control system that may include a wide range of system circuits or software, including, for example, illumination sources control system circuits, timing system circuits, system circuits and other means for coordinating data acquisition in conjunction with sample movements utilizing, for example the motorized X-Y stage, circuits for controlling the position of light sources and detectors, and so forth. In one embodiment, the control system may include one or more processor-based components including a computing apparatus, such as a general purpose or application specific computer. The control system may also include computer-readable memory elements, such as magnetic, electronic, or optical storage media, for storing programs and routines executed by the control system or by associated components of the overall system. The stored programs or routines may include programs or routines for performing all or part of the embodiments of the present disclosure.

The imager may also include a data analysis system. The data analysis system may include a data acquisition system and a data processing system. Image data acquired by the imager detector system may be processed by the imager, for a variety of purposes, including, for example, to convert the acquired data or signal from the detector system to digital values, that may be provided to the data acquisition system. In one embodiment, the data acquisition system may include one or more processor-based components including a computing apparatus, such as a general purpose or application specific computer. The data acquisition system may perform a wide range of processing functions, including, for example, adjustment of digital dynamic ranges, smoothing or sharpening of data, as well as compiling of data streams and files, where desired. The data acquisition system may include circuits or computer-readable memory elements, such as magnetic, electronic, or optical storage media, for storing programs and routines executed by the control system or by associated components of the overall system. The processing functions may include performing all or part of the embodiments of the present disclosure.

The data acquisition system may also transfer acquisition image data to the data processing system, where, for example, additional processing and analysis may be performed, such as substantial analyses of image data, including ordering, sharpening, smoothing, feature recognition, and so forth. The data processing system may include circuits or computer-readable memory elements, such as magnetic, electronic, or optical storage media, for storing programs and routines executed by the control system or by associated components of the overall system. In one embodiment, the data processing system may include one or more processor-based components including a computing apparatus, such as a general purpose or application specific computer. The processed image data may be stored in short or long term storage devices, such as picture archiving communication systems, which may be located within or remote from the imaging system and/or reconstructed and displayed for an operator, such as at an operator workstation.

The operator workstation may display reconstructed images, control the above-described operations and functions of the imaging system, utilizing, for example, an interface with the imager and any components thereof, including, for example, the control system, data acquisition system and the data processing system. The operator workstation may include one or more processor-based components including a computing apparatus, such as a general purpose or application specific computer. The computer may also include various memory and/or storage components including magnetic and optical mass storage devices and internal memory, such as RAM chips. Programs and routines for performing the embodiments of the present disclosure may be stored using such memory and/or storage components included in the operator workstation or by associated components of the system, including a computer accessible storage and/or memory accessible by network and/or communication interfaces present on the computer. The one or more processor-based components may perform all or part of the embodiments of the present disclosure. The one or more processor-based components may also comprise various input/output (I/O) interfaces (including wires, lines, or suitable wireless interfaces (including WIFI, Bluetooth or cellular telephone interfaces) and various network or communication interfaces including local and wide area intranets and storage networks as well as the Internet to allow for communication with various user interface devices, including, for example, a display, keyboard, mouse and printer. The display may include a screen or other devices to provide a visual image for the imaging system and, may also include a touch screen that may operate as an input device as well. Such interfaced devices may be used for viewing and inputting configuration information and/or for operating the imaging system.

More than a single operator workstation may be provided for the imaging system. For example, an imaging scanner or station may include an operator workstation which permits regulation of the parameters involved in the image data acquisition procedure, whereas a different operator workstation may be provided for manipulating, enhancing, and viewing results and reconstructed images, such that, for example, the embodiments of the present disclosure involving, for example, image processing and segmenting described herein may be carried out remotely from the imaging system.

Figure 3:
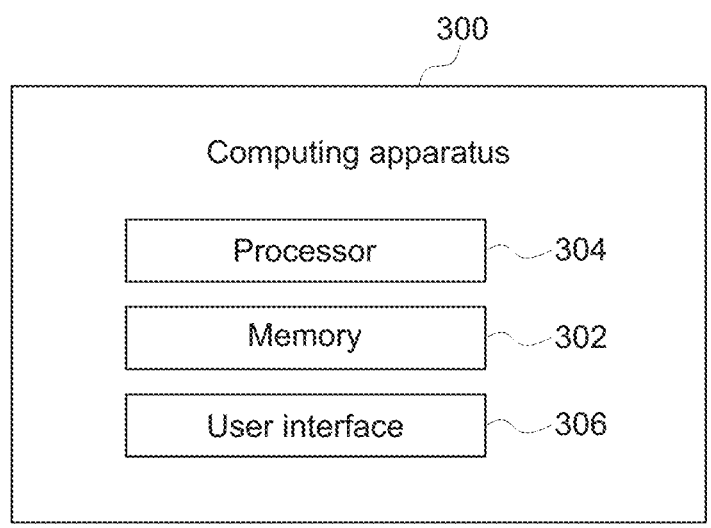
FIG. 3 illustrates a block diagram of an exemplary computing apparatus.

In at least one aspect of the disclosed embodiments, the systems and methods disclosed herein may be executed by one or more computers or processor-based components under the control of one or more programs stored on computer readable medium, such as a non-transitory computer readable medium. FIG. 3 shows a block diagram of an exemplary computing apparatus 300 that may be used to practice aspects of the disclosed embodiment. In at least one exemplary aspect, the control system circuitry, data acquisition system circuitry, data processing system circuitry, operator workstation and other disclosed devices, components and systems may be implemented using an instance or replica of the computing apparatus 300 or may be combined or distributed among any number of instances or replicas of computing apparatus 300.

The computing apparatus 300 may include computer readable program code or machine readable executable instructions stored on at least one computer readable medium 302, which when executed, are configured to carry out and execute the processes and methods described herein, including all or part of the embodiments of the present disclosure. The computer readable medium 302 may be a memory of the computing apparatus 300. In alternate aspects, the computer readable program code may be stored in a memory external to, or remote from, the apparatus 300. The memory may include magnetic media, semiconductor media, optical media, or any media which may be readable and executable by a computer. Computing apparatus 300 may also include a processor 304 for executing the computer readable program code stored on the at least one computer readable medium 302. In at least one aspect, computing apparatus 300 may include one or more input or output devices to allow communication among the components of the exemplary imaging system, including, for example, what may be generally referred to as a user interface 306, such as, the operator workstation described above, which may operate the other components included in the imaging system or to provide input or output from the computing apparatus 300 to or from other components of the imaging system.

A general workflow for analyzing a specimen and obtaining image data thereon utilizing multiplexing imaging technology, such as, for example, the GE Healthcare MultiOmyx™ platform may include staining the specimen with a particular biomarker and obtaining and storing an image of the stained specimen using, for example, the imaging system disclosed above. The specimen is then bleached of the biomarker or otherwise subjected to a process to inactivate the staining of the biomarker including, for example, chemical inactivation before being stained with a different biomarker after which an image of the specimen stained with the second biomarker is similarly obtained and stored. The sequential staining process may be repeated as described and performed as disclosed in U.S. Pat. No. 7,629,125, which is incorporated by reference herein in its entirety for all purposes.

One embodiment of the present disclosure, in general, determines a cell-by-cell analysis of the segmentation image data of a specimen stained with biomarkers for different parts or segments of a cell's anatomy. Cells in a specimen can be differentiated by analyzing there morphology and the images of parts of cell including the nucleus, membrane and cytoplasm. Such differentiation, for example, can be used to identify types of cells in a specimen, particularly when differentiating normal cells from abnormal cells (e.g., cancerous or pre-cancerous cells). In order to increase the reliability of the image data during such a differentiation analysis, it is important for the image of cell to clearly indicate, for example, which portions of the cell are the nucleus and not the cytoplasm or membrane or which portions of the cell are the cytoplasm and not the nucleus or membrane. If a portion of a cell includes image data showing that the portion is marked with more than one biomarker (e.g., a biomarker for the nucleus and a biomarker for the cytoplasm), it is less clear which (nucleus, cytoplasm or membrane) is present in that portion of the cell. If there are too many such portions of the cell, analysis of that cell may be disregarded because the segmentation quality of that cell is "poor".

An exemplary workflow for analyzing the cell-by-cell segmentation quality of a specimen utilizing multiplexing imaging technology, including, for example, the GE Healthcare MultiOmyx™ platform may include staining the specimen with a particular biomarker, such as, for example, a segmentation marker, such as stoma segmentation markers, including, for example, ribosomal protein S6 for cytoplasm, Na+K+ATPase for membrane and epithelial segmentation markers, including, for example, PanCK (pan-cytokeratin). A segmentation marker image of the stained segmentation specimen is obtained and stored using, for example, the imaging system disclosed above. The specimen is then bleached of the biomarker or otherwise subjected to a process to inactivate the staining of the biomarker. An image of the bleached specimen is obtained and stored using the imaging system. The specimen is next stained with a nuclei marker, such as DAPI and a nuclei marker stained image of the specimen is obtained and stored using the imaging system. The nuclei marker stained specimen is then similarly bleached and an image of the post nuclei marker stained specimen is obtained and stored using the imaging system.

In an embodiment of determining the cell-by-cell quality of a specimen, a machine learning approach can be utilized to build a training model in which individual cells from one or more images are classified as showing "good" or "poor" segmentation. The cells so evaluated make up a training set of cells from which a training model can be built. That "good" or "poor" segmentation classification and image data from the individual cells in the training set are then combined to build the training model that can used to evaluate cell image data of a test specimen. Different supervised learning approaches can be used to classify the cells of the training set used to build the training model. In one embodiment, a training set of all the cells evaluated for the training model ("good" and "poor") is created and used to build two separate training models, one with cells possessing "good" segmentation and another for cells possessing "poor" segmentation. In another embodiment, a training model of only those cells that were identified as possessing "good" segmentation can be defined while the model for "poor" segmentation can be anything that is not included in the model of those "good" segmentation cells. For the latter embodiment, only cells with "good" segmentation are used to create the training set from which the training model is built. In order to classify the separate image of a test specimen, each of the segmented cells in the test specimen image are classified as being "similar to" or "different from" the "good" segmentation training model built from the training set of cell possessing "good" segmentation.

Figure 4:
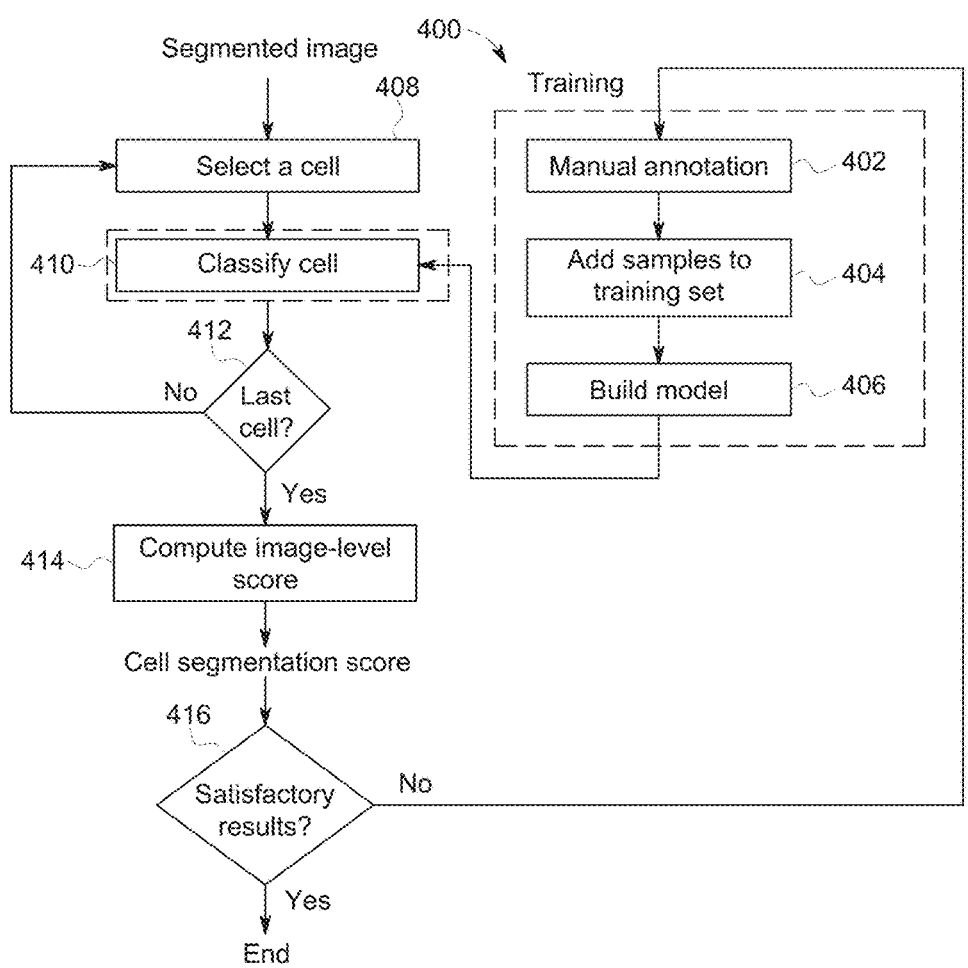
FIG. 4 is a flow diagram illustrating an embodiment of building a training model and comparing a cell in a test specimen to the training model.
Figure 5A:
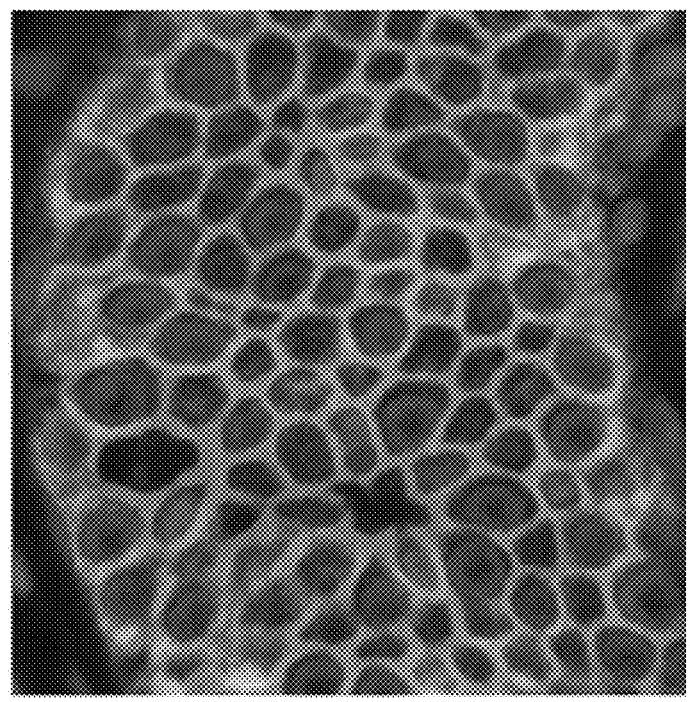
FIG. 5A illustrates an example of composite raw image of a tissue sample.
Figure 5B:
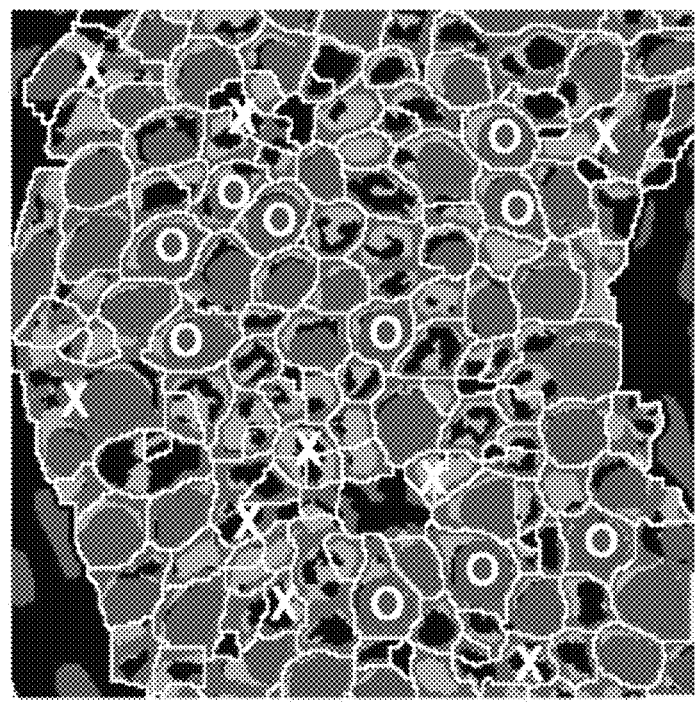
FIG. 5B illustrates a composite segmentation image of the composite raw image of FIG. 5A.

In yet another embodiment, the training set can be built, for example, as shown in the work flow diagram of FIG. 4. In the training 400 section of the diagram, manual annotation 402 of cells for which image data has been gathered is performed. In order to gather the image data, a specimen is treated with biomarkers, such as S6 for cytoplasm, Na+K+ ATPase for membrane and DAPI for DNA. As is explained previously, such data includes images of the cells in a specimen with each biomarker including a bleaching in between. AF (auto-fluorescence) images are also obtained and stored of the bleached cells, as described above. The AF image data obtained and subsequently utilized may be one or a combination of both bleached specimen images obtained. As part of the manual annotation 402, cells from specimens are classified by evaluating the image data manually by a human evaluator (e.g., a technician, cell biologist, pathologist or other expert) as exhibiting "good" segmentation are included in a training set 404. Manual annotation can also include, for example, an evaluation of the image by the human evaluator. The manual annotation examines the cells to determine such features as, for example, minimal biomarker overlap among cell segments (e.g., nucleus, membrane and cytoplasm) and similar cell features (e.g., Table 1 below) characteristic of the cell type being examined. For example, the boundaries of the cell segments (e.g., nucleus, membrane and cytoplasm) should be substantially clearly defined in the image and as such resulting in minimal biomarker overlap referred to above. A visual example is shown in FIG. 5A and FIG. 5B. FIG. 5A is a composite raw image and FIG. 5B is a composite segmentation image of composite raw image of FIG. 5A. In FIG. 5B, cell compartments are show in red (membrane), green (cytoplasm) and blue (nuclei), and cell segmentation boundaries are shown in white. In this example, in a cell image demonstrating "good" segmentation, the cell segmentation boundaries should delineate the outer edge of the cell membrane or its centerline if it separates two touching cells. Furthermore, the three cell compartments should be detected/segmented with the cell nucleus in the middle of the cell, the membrane representing the outer compartment and the cytoplasm in-between the nucleus and the membrane. As examples, FIG. 5B includes "good" segmentation cells are annotated with a white "O" and "poor" segmentation cells are annotated with a white "X". The manual annotation referred to above may include examining a composite raw image, a composite segmentation image or preferably both.

For one embodiment, in order to create the training set 404, image features of the cells possessing "good" segmentation in the training set are used to compare those cells in the training set to cells in the image of a test specimen. The image features so utilized can, for example, may include those image features listed in Table 1 below.

TABLE 1

List of features used for cell segmentation QC

| Features Category | List of features |
|---|---|
| Area | cell area, nucleus area, nucleus/cell ratio, membrane/cell ratio |
| Shape/morphology | Shape features: extent (ratio of cell area to area of a bounding box around the cell) and eccentricity (ratio of cell perimeter to cell area) |
| Intensity | ratio of intensity of membrane segmentation marker at the cell membrane to the rest of the cell ratio of intensity of cytoplasm segmentation marker in the cell cytoplasm to the rest of the cell |
| Biology-driven | number of nuclei per cell |

Some of the image features can also be used to ascertain other image features of the training set cells that can be used when comparing the training set to the test specimen. For example, the shape features "extent" and "eccentricity" included in Table 1 can be used to indicate that the shape of a cell, including whether the cell's shape is concave or convex.

From the training set 404, a training model build 406 is created from the image feature data of the cells in the training set. This process involves creating a feature vector for cells in the training set. The number of dimensions present in the feature vector depends on how many image features of each cell are to be used when comparing the training set to the cells in the test specimen. For example, if two image features are to be used to build the training model, the feature vector of each cell in the training set will be in two dimensions. If nine image features are to be used to build the training model, the feature vector of each cell in the training set will be in nine dimensions.

Once image features are selected, the training model can be built utilizing the data of the above features from the cells using one of several different model learning/estimation mathematical analysis methods. Such mathematical analysis methods can be include, for example, one-class support vector machines (one-class SVM), parametric or non-parametric density estimation and quantile function estimation.

Once the training model is built, it can be used to evaluate the cells in a test specimen image and determine which cells in that image possess "good" segmentation and which cells possess "poor" segmentation. The goal of the training step is to fit the smallest hyper-sphere to the training data (i.e. minimize the size). Therefore, the training model can be defined as a hyper-sphere in the feature space. The dimensionality of that space depends on how many image features are used to build the model.

Figure 6:
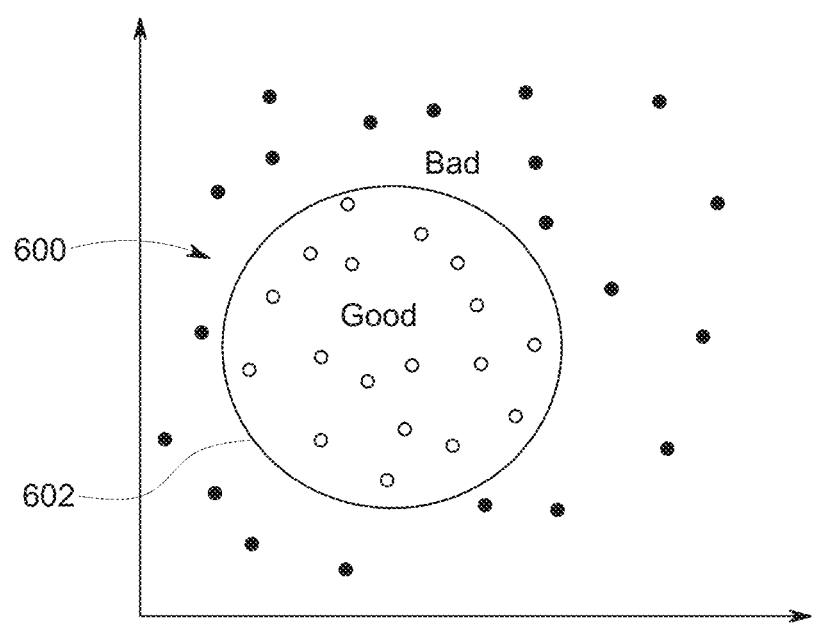
FIG. 6 illustrates an example of a 2-D feature training model hypersphere.
Figure 7A:
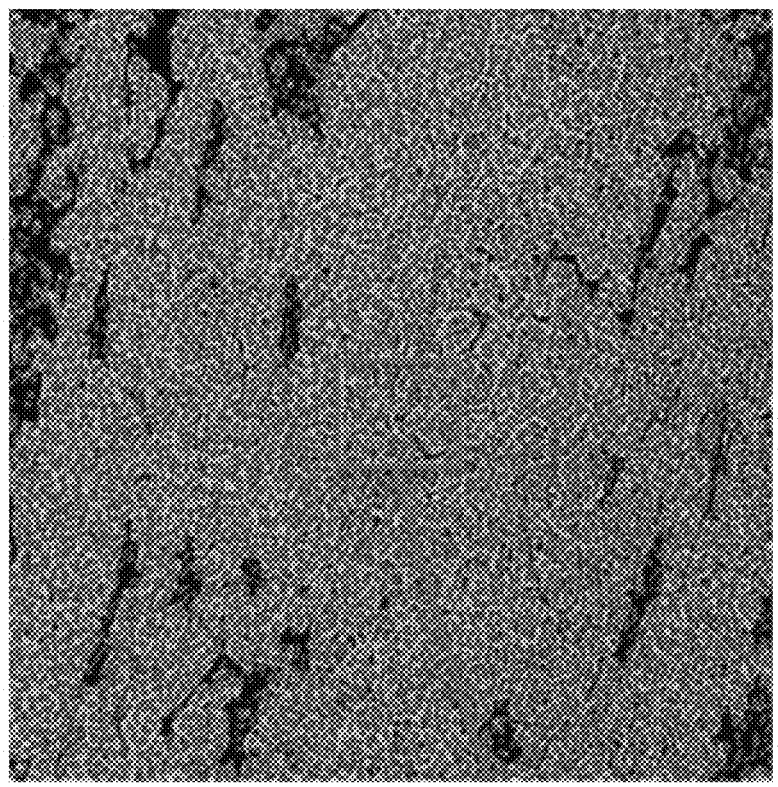
FIG. 7A is a low resolution image of an output composite segmentation image of Experiment 2.
Figure 7B:
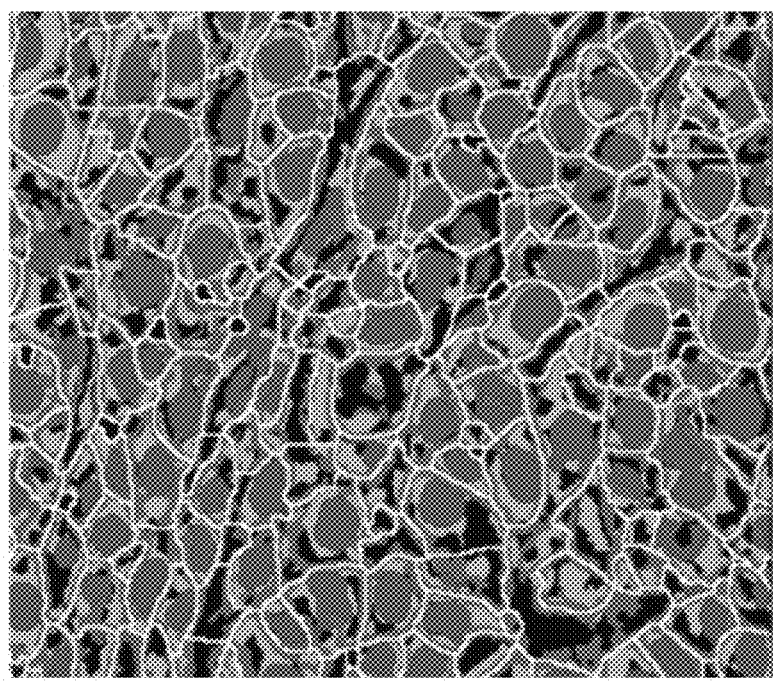
FIG. 7B is a higher resolution image of the output composite segmentation image of FIG. 7A.
Figure 7C:
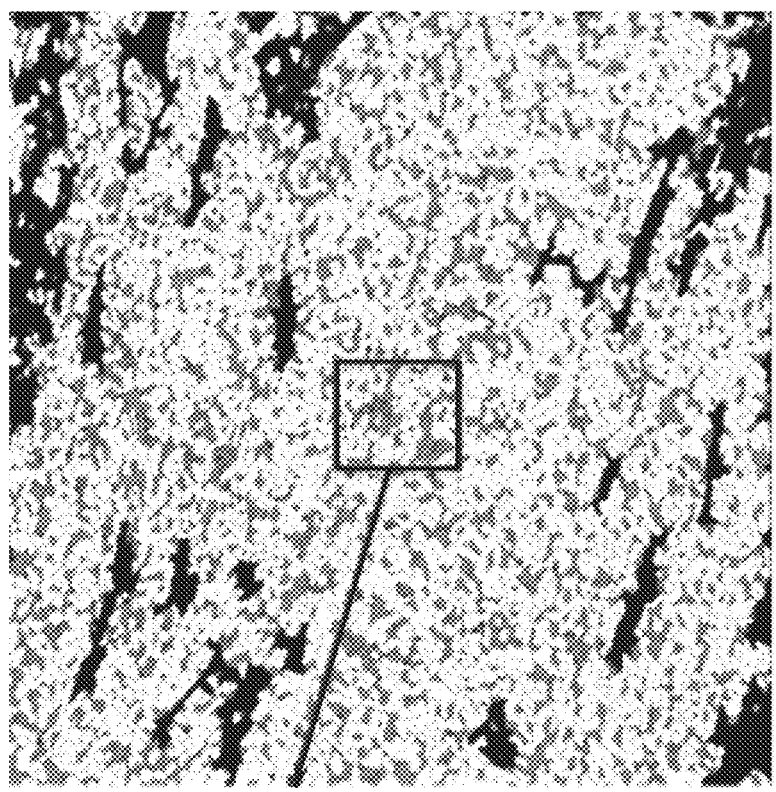
FIG. 7C is a low resolution image of the classified segmentation results of the image in FIG. 7A.
Figure 7D:
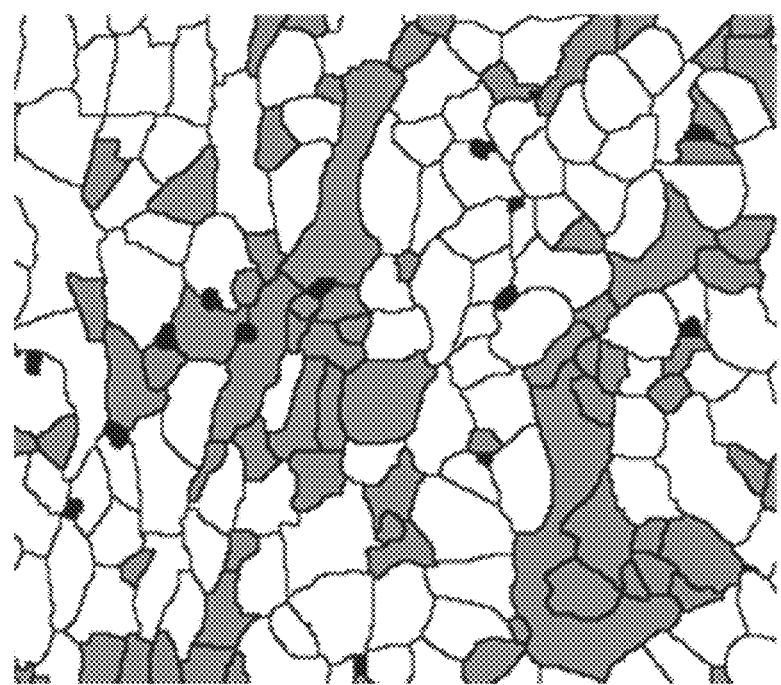
FIG. 7D is a higher resolution image of the classified segmentation results of the image in FIG. 7C.
Figure 8A:
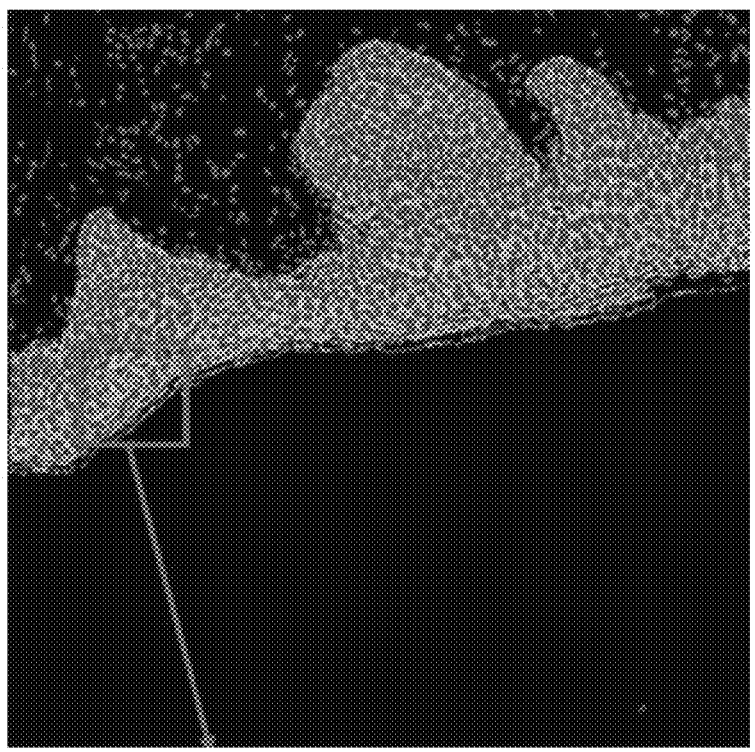
FIG. 8A is a low resolution image of an output composite segmentation image of Experiment 3.
Figure 8B:
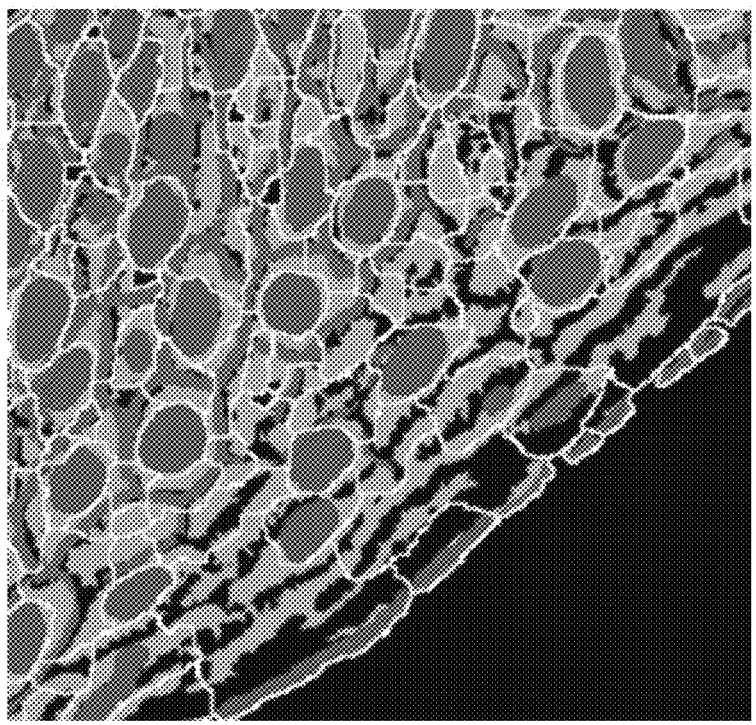
FIG. 8B is a higher resolution image of the output composite segmentation image of FIG. 8A.
Figure 8C:
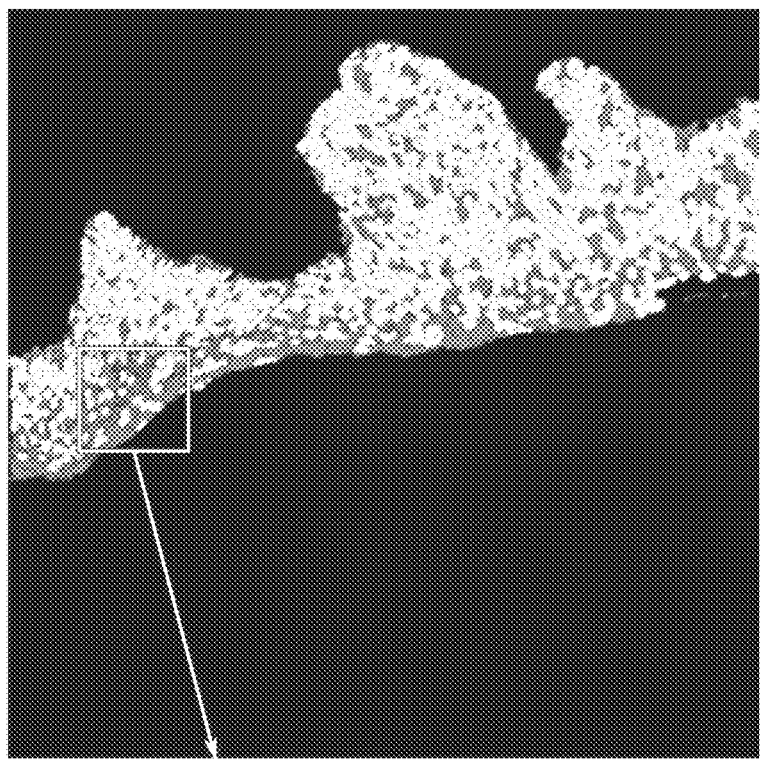
FIG. 8C is a low resolution image of the classified segmentation results of the image in FIG. 8A.
Figure 8D:
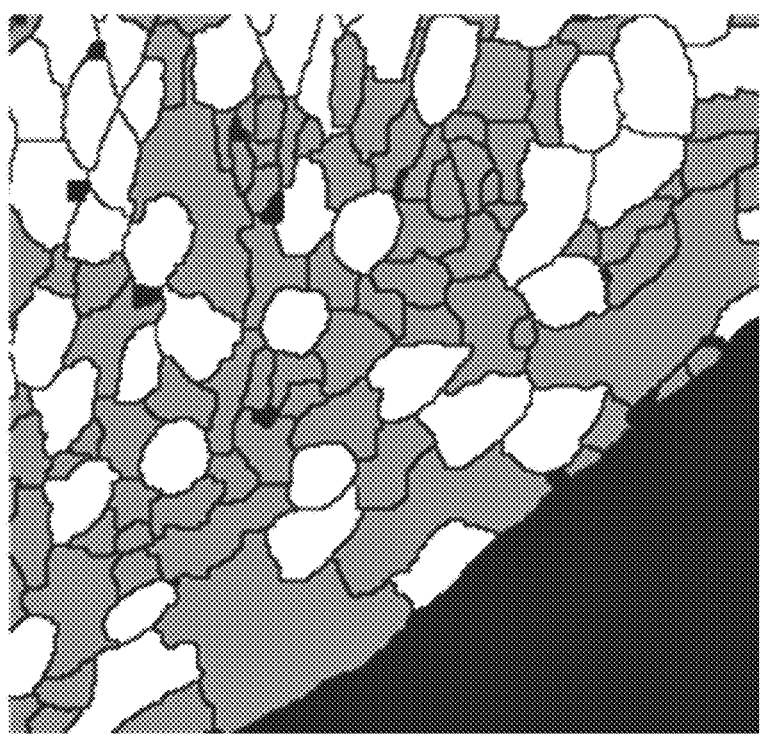
FIG. 8D is a higher resolution image of the classified segmentation results of the image in FIG. 8C.
Figure 9A:
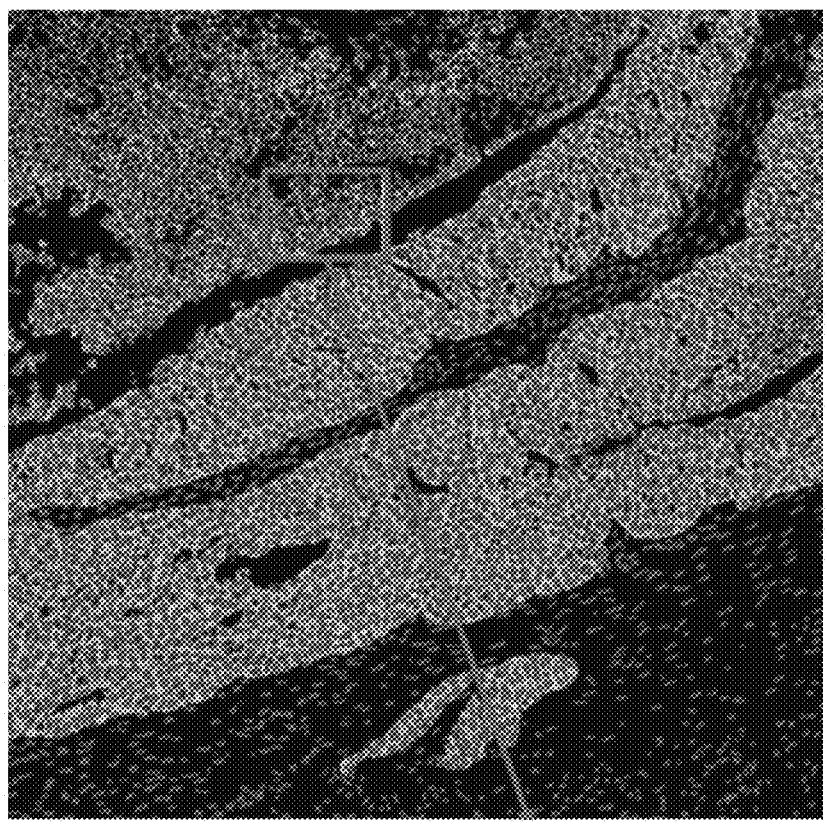
FIG. 9A is a low resolution image of an output composite segmentation image of Experiment 3.
Figure 9B:
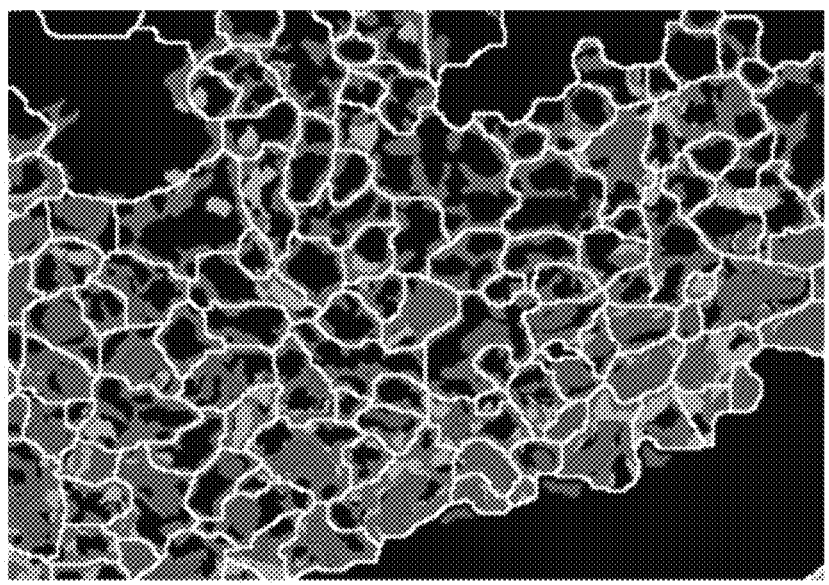
FIG. 9B is a higher resolution image of the output composite segmentation image of FIG. 9A.
Figure 9C:
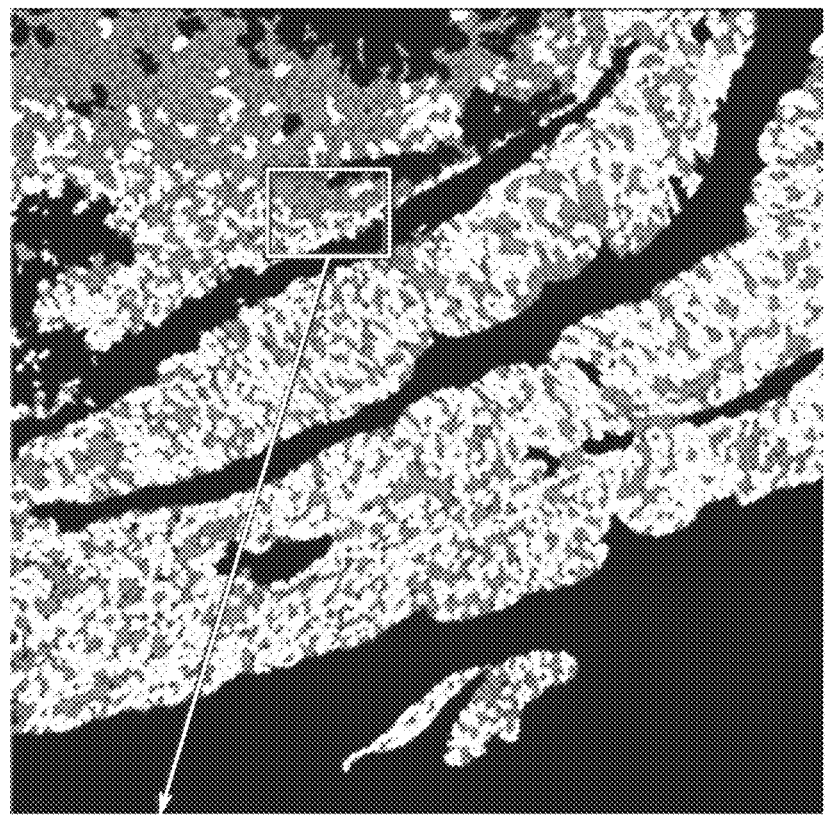
FIG. 9C is a low resolution image of the classified segmentation results of the image in FIG. 9A.
Figure 9D:
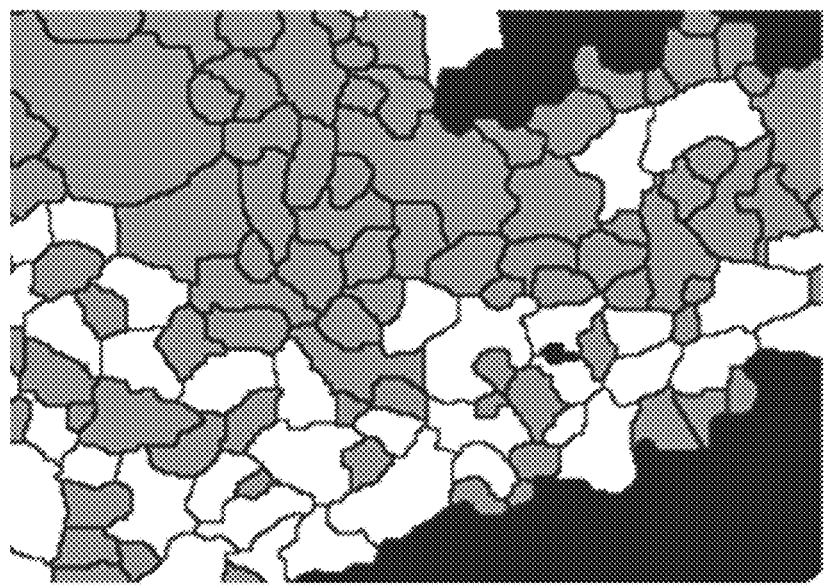
FIG. 9D is a higher resolution image of the classified segmentation results of the image in FIG. 9C.

A pictorial example of a two image feature (two dimensional, 2-D) training model is shown in FIG. 6. FIG. 6 illustrates an example in a 2-D feature space in which the one-class SVM mathematical analysis method is used to fit a hyper-sphere 600 to the training data. In FIG. 6, once the dimensions of the hyper-sphere are defined, the open dots inside the circle (hyper-sphere in high dimensional feature space) represent cells in the test specimen image with "good" segmentation, while those outside (the filled in dots) represent cells with "poor" segmentation. If there were any dots on the boundary 602 of the hyper-sphere 600, those would represent cells with "good" segmentation as well. In another example, in a training model in which, three image features are included, the resulting sphere would be in three dimensional space and the size of the sphere would be defined by its volume in three dimensional space. In yet another training model in which, for example, nine image features are included, the resulting hyper-sphere would be in nine dimensional space and the size of the hyper-sphere would be defined in nine dimensional space. As with the example utilizing two features in two-dimensional space, determining which test specimen cells possess "good" segmentation and which cells possess "poor" segmentation according to the training model, those cells that are inside or on the boundary of the hyper-sphere possess "good" segmentation and those cells that are outside the hyper-sphere possess "poor" segmentation where the size of the hyper-sphere is estimated in the training step.

In creating the training model build, other criteria than image features may also be taken into consideration and may include the number of cells, the type of cells and the biomarker or biomarkers used. The number of cells can depend on having a sufficient number of cells in the training set that are similar to the cells in the specimen to be analyzed. Such as, the training set may have a sufficient number of cells of a similar shape (e.g., round, elongated, etc.) or a sufficient number of cells of the same cell or tissue type (e.g., colon cancer cells). For example, for a specimen to be evaluated where the specimen is a homogeneous sample with only one cell type of the same general shape, fewer cells in training set may be needed. For a specimen to be evaluated where the specimen is a heterogeneous sample with different types of cells and different shapes, a sufficient number of cells taking each category into account is preferable resulting in the need for more overall cells in order to have enough cells of each category in the overall pool. For example, from about 50 to about 100 cells may good, from about 101 to about 200 may be better and from about 201 to about 300 may still better. Another factor to include in determining the number of cells is the quality of the segmented cell images.

One embodiment may utilize the same biomarker or biomarkers used for both the training set and the test specimen. For another embodiment, the biomarker or biomarkers used may not be the same, but may be the same type of biomarker (e.g., membrane biomarkers, cytoplasm biomarkers or nuclear (DNA) biomarkers.

For the exemplified embodiment shown in FIG. 4, once training 400 is completed and the training model is built, each unclassified cell in a test specimen image can be compared to the training model. "Unclassified cell" is meant to mean segmented cells in a specimen whose cell-by-cell segmentation image score is yet to be obtained. The comparison is based on the image data for each such unclassified cell in the test specimen image that has been obtained including the same image features that were used to build the training model, for example, the image features included in Table 1. The number of image features used can be, for example, one or more of the nine of the features included in Table 1. In one embodiment, one unclassified cell from the test specimen image is selected at a time 408. In the next step, the selected unspecified cell is classified 410 as having "good" or "poor" segmentation based on the training model for the same image features used to build the training model. In this classifying step 410, for example, the features of the selected unspecified cell and the feature vectors resulting there from are subjected to the same mathematical approach as was used to build the training model from the training set (for example, model learning/estimation mathematical analysis methods such as one-class support vector machines (one-class SVM), parametric or non-parametric density estimation and quantile function estimation). The feature results are then compared to the hyper-sphere (or more specifically to obtain a spherical boundary) in the training model. Based on the comparison, that cell is assigned to be included in the "good" segmentation class if it is inside or on the boundary of the hyper-sphere or is assigned to the "poor" segmentation class if it is outside the boundary of the hyper-sphere.

Once the analysis is completed on the first cell in the specimen, the next step involves determining whether there are other cells in the test specimen to be similarly analyzed and each additional cell is analyzed one at a time. For example, if after classifying step 410 is completed for the first cell, the system is asked whether it has analyzed the last cell in the test specimen 412. If no at 412, then the system goes back to selecting another cell 408. If the last cell has been analyzed and the answer is yes at 412, the collection of image data can then be used to determine the overall segmentation image quality of the test specimen or any portion of the test specimen from which the cells were analyzed and compared to the training model.

Once the cells in the specimen have been analyzed and classified as a "good" segmentation specimen cell or a "poor" segmentation specimen cell, an image-level score can be determined 414. The image-level score is computed 414 by using the cell level classes ("good"/"poor" segmentation) to extract a "good" cell segmentation mask and to compute an overall (image-level) cell segmentation score ($S_c$) using, for example the Algorithm below.

---

Algorithm: Computing Cell Segmentation Quality Score Using Annotated Samples

Given the sets of "All" segmented cells $S_a$ and "Good segmentation" cells $S_g$, let $\int S_a$ and $\int S_g$ be the areas of the corresponding masks.
Define the cell segmentation quality score ($S_c$) as follows:

$$S_c = 10 \times \left( w \times \frac{\int S_g}{\int S_a} + (1-w) \times \frac{|S_g|}{|S_a|} \right), 0 \leq w \leq 1$$

Where | | represent the cardinality of the set we used w = 0.6

In the equation used in the Algorithm, two mathematical terms are utilized to determine segmentation quality score for the specimen ($S_c$). The first term, $\int S_g / \int S_a$, corresponds to the ratio of the total area of "good" segmented cells in the test specimen, or a portion thereof, to the total area of all cells in the specimen or the same portion thereof. The second term, $|S_g|/|S_a|$ corresponds to the ratio of the total number of cells that are "good" segmented cells in the specimen or the portion thereof to the total number of all cells in the specimen or the same portion. "w" is the weighting factor that is selected by the user to equally incorporate the first term and second term into calculating $S_c$ or to favor one term over the other and by how much. For example, to equally utilize both terms w=0.5; to favor the first term, w should be greater than 0.5, for example, w=0.6; and to favor the second term, w should be less than 0.5, for example, w=0.4. The value of w was empirically estimated using the training data.

The above algorithm can also be used to evaluate the training model and adjust w when the training model is used to evaluate unclassified cells in a specimen. In evaluating the training model, the same training set of cells that were used to build the training model may be evaluated using the training model in order to determine the accuracy of the training model. In this procedure, a segmentation quality score for the specimen ($S_c$) is determined for the training model. For example, if all cells in the training set used to build the training model were manually classified as having "good" segmentation, the $S_c$ for the training model should be 10. As another example, if half the cells in the training model show "good" segmentation and all the cells are about the same size, the $S_c$ for the training model should be 5. Next a segmentation quality score for the specimen ($S_c$) is determined for each of the cells in the training set that were used to build the training model using the training model itself.

For example, each cell in the training set and the feature vectors resulting there from are subjected to the same mathematical analysis method used to build the training set (for example, one-class support vector machines (one-class SVM), parametric or non-parametric density estimation and quantile function estimation) and the same w weighting factor that was used. As with the procedure above using unclassified cells, the same features used to build the training model are determined for the cells in the training set. The feature results from the training set cells are then compared to the hyper-sphere (or more specifically to obtain a spherical boundary) in the training model. Based on the comparison, each training set cell is assigned to be included in "good" segmentation class if it is inside or on the boundary of the hyper-sphere or is assigned to the "poor" segmentation class if it is outside the boundary of the hyper-sphere. A segmentation quality score ($S_c$) for the training set cells is determined using the same w weighting factor that was used to calculate the segmentation quality score ($S_c$) of the training model. The segmentation quality score ($S_c$) for the training set cells is compared to the segmentation quality score ($S_c$) of the training model itself.

An alternative method of evaluating the training set cells using the training model is to build is to evaluate each cell in the training set using a training model that includes all the cells in the training set except the cell that is being evaluated. This can be referred to as a leave-one-out cross validation using the training set. Once all the training set cells are evaluated, the segmentation quality score ($S_c$) for the training set cells is determined and compared to the segmentation quality score ($S_c$) of the training model.

An accuracy of 100% means that all the training set cells were evaluated correctly when compared to the training model they were used to build (e.g., all the cells designated to have "good" segmentation were in the training model were identified as having "good" segmentation when analyzed versus the training model; the segmentation quality score ($S_c$) for the training set cells is the same as the segmentation quality score ($S_c$) of the training model). In practice, a 100% accuracy is very difficult to achieve. However, if the segmentation quality score ($S_c$) for the training set cells is different from ($S_c$) of the training model, the w weighting factor can used in determining segmentation quality score ($S_c$) for the training set cells can be used to adjust the accuracy results of the algorithm in order to obtain an accuracy as close to 100% as possible given the training model that was prepared.

When the image-level score ($S_c$) is computed 414, a high score (max is 10) indicates "good" image segmentation and a low score (min is 0) indicates "poor" image segmentation. The acceptance threshold can be determined by the expert depending on the needs of the experiment. For example, if very accurate cell segmentation is critical, only a score of 8 or higher can be accepted. In other situations where accurate cell segmentation is not critical, a score of 6 of higher can be accepted.

Examples

Experiments were performed to evaluate embodiments of the present disclosure utilizing the GE Healthcare MultiOmyx™ platform.

In Experiment 1, the Algorithm for cell segmentation QC was utilized using manually annotated (by an expert, e.g., pathologist, technician, cell biologist, etc.) segmented cells. A set of 390 cells were annotated by an expert including 175 "good" and 215 "poor" segmentation cells selected from 15 images. That set was then divided into a training set of 100 "good" segmented cells and a test set of 290 segmented cells (75 cells with "good" segmentation and 215 cells with "poor" segmentation) selected from 10 images. A leave-one-out cross validation using the training set was performed and achieved %100 cell classification accuracy with w the weighting factor being set to 0.6. This is done by building the model of the training set after excluding one cell (i.e. using 99 cells) and then using that model to classify the cell that was excluded. This operation was repeated 100 times, each time a different cell was excluded from the training set. Then, the cells in the test set were classified using the One-class SVM method. The results are shown in Table 2 below. The classifier yielded high accuracy (89%), which is defined as the ratio of true positives to the 75 "good" segmentation cells of the test set of 290 segmented cells, sensitivity (95%), which is defined as the ratio of true positives to the sum of true positives and false negatives, and specificity (87%) when compared to the classification of each cell in the test set (i.e., 75 cells with "good" segmentation and 215 cells with "poor" segmentation), which is defined as the ratio of true negatives to the sum of true negatives and false positives values. True positives are defined as any of the 75 "good" segmentation cells of the test set of 290 segmented cells that are classified as "good" by the classifier. True negatives are defined as any of the 215 "poor" segmentation cells of the test set of 290 segmented cells that are classified as "poor" by the classifier. False positives (FP in Table 2) are defined as any of the 75 "good" segmentation cells of the test set of 290 segmented cells that are classified as "poor" by the classifier. False negatives are defined as any of the 215 "poor" segmentation cells of the test set of 290 segmented cells that are classified as "good" by the classifier.

TABLE 2

Cell segmentation QC results

| | True Class | |
|---|---|---|
| | Good | Bad |
| Good | 71 | 28 (FP) |
| Bad | 4 (FN) | 187 |

FIGS. 7-9 show additional experiments (Experiments 2-4, respectively) using the same equipment and training model used in Experiment 1 to classify three other specimens. Each figure shows the whole segmented image and a close-up of a given region. FIGS. 7A, 8A and 9A are each a low resolution image of an output segmentation composite image of each respective specimen showing cell boundaries in white as well as blue, green and red represent the cell nuclear, cytoplasm and membrane compartments, respectively as determined by such biomarkers. FIGS. 7B, 8B and 9B are a higher resolution of the same respective output composite segmentation images shown in FIGS. 7A, 8A and 9A of each of the three specimens again with cell boundaries in white as well as blue, green and red represent the cell nuclear, cytoplasm and membrane compartments, respectively. FIGS. 7C, 8C and 9C are each a low resolution image of the classified segmentation results of each of the three specimens (shown in FIGS. 7A, 8A and 9A, respectively) with "good" and "poor" cells colored in white and gray respectively. FIGS. 7D, 8D and 9D are a higher resolution of the same respective output composite images shown in FIGS. 7C, 8C and 9C again with "good" and "poor" cells colored in white and gray respectively. The overall (image-level) cell segmentation score ($S_c$) of FIG. 7D is 7.9. The overall (image-level) cell segmentation score ($S_c$) of FIG. 8D is 7.6. The overall (image-level) cell segmentation score ($S_c$) of FIG. 9D is 4.6.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for determining the quality of cell segmentation of a marker stained biological specimen, comprising:
   obtaining training image feature data and selecting training image features for a plurality of cells in a training set stained with a plurality of segmentation markers, the plurality of cells comprises at least one cell with "good" segmentation as annotated by an expert, the at least one cell having a training image feature vector defined by the training image features,
   creating a training image feature space comprising a hyper-sphere with a spherical boundary, wherein a dimension of the training image feature space is determined by a dimension of the training image features and the size of the hyper-sphere is defined by its volume in the feature space, wherein the size of the hyper-sphere is adjustably modified so that the training image feature vector of the at least one cell with "good" segmentation is inside or on the boundary of the hyper-sphere;
   selecting test image features and extracting test image feature data for a test cell stained with at least one segmentation markers in the marker stained biological specimen, wherein the test image features are selected to be the same as the training image features, and the test cell has a test image feature vector defined by the test image features;
   applying the hyper-sphere to the test image feature vector and determining whether the test image feature vector of the at least one test cell is on the boundary of, inside or outside the hyper-sphere of the training image feature space, the test image feature vector being on the boundary of or inside the hyper-sphere indicating that the at least one test cell includes "good" segmentation and the test image feature vector being outside the hyper-sphere indicating that the at least one segmentation marker stained test cell includes "poor" segmentation.

2. The method of claim 1, wherein the step of obtaining training image feature data for the plurality of cells in the training set further comprises:
   staining a training specimen including the plurality of training cells with a first segmentation marker to form a first segmentation marker stained training specimen;
   acquiring an image of the first segmentation marker stained training specimen;
   bleaching the first segmentation marker stained training specimen to form a first bleached training specimen;
   acquiring an image of the first bleached training specimen;
   staining the first bleached training specimen with a second segmentation marker to form a second segmentation marker stained training specimen, wherein the second segmentation marker is different from the first segmentation marker;
   acquiring an image of the second segmentation marker stained training specimen;
   bleaching the second segmentation marker stained training specimen to form a second bleached training specimen;
   acquiring an image of the second bleached training specimen;
   staining the second bleached training specimen with a third segmentation marker to form a third segmentation marker stained training specimen, wherein the third segmentation marker is different from the first segmentation marker and the second segmentation marker; and
   acquiring an image of the third segmentation marker stained training specimen.

3. The method of claim 2, wherein the first segmentation marker, the second segmentation marker and the third segmentation marker include a cytoplasm segmentation marker, a membrane segmentation marker or a nuclei segmentation marker.

4. The method of claim 1, wherein the step, of obtaining test image feature data for the at least one test cell comprises:
   staining a test specimen including the at least one test cell with a first segmentation marker to form a first segmentation marker stained test specimen;

acquiring an image of the first segmentation marker stained test specimen;

bleaching the first segmentation marker stained training specimen to form a first bleached test specimen;

acquiring an image of the first bleached test specimen;

staining the first bleached test specimen with a second segmentation marker to form a second segmentation marker stained test specimen, wherein the second segmentation marker is different from the first segmentation marker;

acquiring an image of the second segmentation marker stained test specimen;

bleaching the second segmentation marker stained test specimen to form a second bleached test specimen;

acquiring an image of the second bleached test specimen;

staining the second bleached test specimen with a third segmentation marker to form a third segmentation marker stained test specimen, wherein the third segmentation marker is different from the first segmentation marker and the second segmentation marker; and acquiring an image of the third segmentation marker stained test specimen.

5. The method of claim 4, wherein the first segmentation marker, the second segmentation marker and the third segmentation marker each include a cytoplasm segmentation marker, a membrane segmentation marker or a nuclei segmentation marker.

6. The method of claim 1, wherein the plurality of cells in the training set includes from about 50 to about 400 cells.

7. The method of claim 1, wherein the plurality of cells in the training set includes from about 100 to about 200 cells.

8. The method of claim 1, wherein the training image features are selected from a plurality of cell features comprising cell area, nucleus area, nucleus/cell ratio, membrane/cell ratio, extent, eccentricity, ratio of intensity of membrane segmentation marker at the cell membrane to the rest of the cell, or ratio of intensity of cytoplasm segmentation marker in the cell cytoplasm to the rest of the cell or number of nuclei per cell, or a combination thereof.

9. The method of claim 1, wherein the test cells is one of a plurality of test cells stained with the plurality of segmentation markers, and the method further comprising the steps of:

obtaining test image feature data for each cell in the plurality of test cells, the test image feature data including a plurality of cell features for each cell in the plurality of test cells;

isolating the test image feature data for each cell in the plurality of test cells;

creating a test image feature vector from the test image feature data for each cell in the plurality of test cells, the number of dimensions of the test image feature vector for each cell in the plurality of test cells depending on the number of cell features in the plurality of cell features for each cell in the plurality of test cells, wherein the cell features for each cell in the plurality of test cells are the same; and determining whether the test image feature vector for each cell in the plurality of test cells is on the boundary of, inside or outside the hyper-sphere of the training model, the test image feature vector being on the boundary of or inside the hyper-sphere indicating that the at least one test cell includes "good" segmentation and the test image feature vector being outside the hyper-sphere indicating that the at least one test cell includes "poor" segmentation.

10. The method of claim 9, further including determining a cell segmentation quality score ($S_c$) for the image including the plurality of test cells, wherein $$S_c = 10 \times \left( w \times \frac{\int S_g}{\int S_a} + (1-w) \times \frac{|S_g|}{|S_a|} \right),$$

w is a weighting factor where $0 \leq w \leq 1$, $\int S_a$ is the total cell area of the cells included in the plurality of test cells, $\int S_g$ is the total cell area of the cells determined to include "good" segmentation in the plurality of test cells, $|S_g|$ is the total number of cells that are "good" segmented cells in the plurality of test cells and $|S_a|$ is the total number of all cells in the plurality of test cells.

11. An imaging system for assessing the quality of a segmentation marker stained biological specimen, comprising:

an imager configured to acquire and process image data of a biological specimen, the imager including
  a stage configured to support a biological specimen,
  an illumination source configured to emit electromagnetic energy,
  a detector system including a detector configured to detect electromagnetic energy reflected or emitted from the biological specimen resulting from exposure to the electromagnetic energy from the illumination source, and
  an optical system configured to direct the electromagnetic energy from the illumination source toward the biological specimen and direct electromagnetic energy from the biological speciment toward the detector;

a workstation including a display;
an A/D converter;
an image acquisition and analysis system configured to process the image data into processed image data; and
a memory configured to store instructions for:
  building a training model including:
    obtaining at least one image of a plurality of segmentation marker stained training cells using the imager;
    converting the at least one image of the plurality of segmentation marker stained training cells to training image feature data for the plurality of segmentation marker stained training cells using the A/D converter, the training image feature data including a plurality of cell features for each cell in the plurality of segmentation marker stained cells,
    displaying using the workstation the training image feature data for an expert;
    receiving from the expert using the workstation information a designation of which cells in the plurality of segmentation marker stained training cells include "good" segmentation,
    obtaining training image feature data and selecting training image features for a plurality of cells in a training set stained with a plurality of segmentation markers, the plurality of cells comprises at least one cell with a "good" segmentation as designated by the expert, the at least one cell having a training mage feature vector defined by the training image features, creating a training image feature space comprising a hyper-sphere with a spherical boundary, wherein a dimension of the training image feature space is determined by a dimension of the training image features and the size of the hyper-sphere is defined by its volume in the feature space, wherein the size of the hyper-sphere is adjustably modified so that the training image feature vector of the at least one cell with "good" segmentation is inside or on the boundary of the hyper-sphere;

determining whether a segmentation marker stained test cell from the marker stained biological specimen includes "good" segmentation or "poor" segmentation including:

obtaining at least one image of at least one segmentation marker stained test cell using the imager;

converting the at least one image of the at least one segmentation marker stained test cell to test image feature data for the at least one segmentation marker stained test cell using the A/D converter, wherein the test image features are selected to be the same as the training image features, and the test cell has a test image feature vector defined by the test image features;

applying the hyper-sphere to the test image feature vector and determining whether the test image feature vector of the at least one test cell is on the boundary of, inside or outside the hyper-sphere of the training image feature space, the test image feature vector being on the boundary of or inside the hyper-sphere indicating that the at least one test cell includes "good" segmentation and the test image feature vector being outside the hyper-sphere indicating that the at least one segmentation marker stained test cell includes "poor" segmentation.

12. The imaging system of claim 11, wherein the memory is further configured to store instructions for:

obtaining at least one image of at least one segmentation marker stained test cell using the imager;

converting the at least one image of the of the at least one segmentation marker stained test cell to test image feature data for the at least one segmentation marker stained test cell using the A/D converter, wherein the test image features are selected to be the same as the training image features, and the test cell has a test image feature vector defined by the test image features;

applying the hyper-sphere to the test image feature vector and determining whether the test image feature vector of the at least one test cell is on the boundary of, inside or outside the hyper-sphere of the training image feature space, the test image feature vector being on the boundary of or inside the hyper-sphere indicating that the at least one test cell includes "good" segmentation and the test image feature vector being outside the hyper-sphere indicating that the at least one segmentation marker stained test cell includes "poor" segmentation.

13. The imaging system of claim 12, wherein the memory is further configured to store instructions for determining a cell segmentation quality score ($S_c$) for the image including a plurality of segmentation marker stained test cells, wherein $$S_c = 10 \times \left( w \times \frac{\int S_g}{\int S_a} + (1-w) \times \frac{|S_g|}{|S_a|} \right),$$

w is a weighting factor where $0 \leq w \leq 1$, $\int S_a$ is the total cell area of the cells included in the plurality of segmentation marker stained test cells, $\int S_g$ is the total cell area of the cells determined to include "good" segmentation in the plurality of segmentation marker stained test cells, $|S_g|$ is the total number of cells that are "good" segmented cells in the plurality of segmentation marker stained test cells and $|S_a|$ is the total number of all cells in the plurality of segmentation marker stained test cells.

14. A method for determining the quality of cell segmentation of a marker stained biological specimen with an imager configured to acquire and process image data of a biological specimen, the imager including a stage configured to support the biological specimen, an illumination source configured to emit electromagnetic energy, a detector system including a detector configured to detect electromagnetic energy reflected or emitted from the biological specimen resulting from exposure to the electromagnetic energy from the illumination source, an optical system configured to direct the electromagnetic energy from the illumination source toward the biological specimen and direct electromagnetic energy reflected or emitted from the biological specimen toward the detector, a data analysis system, and a workstation including a display the method comprising:

obtaining training image feature data and selecting training image features for a plurality of cells in a training set stained with a plurality of segmentation markers, the plurality of cells comprises at least one cell with "good" segmentation as annotated by an expert, the at least one cell having a training image feature vector defined by the training image features, including:

positioning the plurality of segmentation marker stained training cells on the stage;

illuminating the plurality of segmentation marker stained training cells using the illumination source;

detecting the light reflected or emitted from the plurality of segmentation marker stained training cells using the detector system; and converting the detected the light reflected or emitted from the plurality of segmentation marker stained training cells to the training image feature data by the data analysis system, examining the training image feature data visually by an expert using the workstation display each cell in the plurality of segmentation marker stained training cells to determine which cells in the plurality of segmentation marker stained training cells include "good" segmentation, identifying by the expert using the workstation each cell in the plurality of segmentation marker stained training cells that includes "good" segmentation, creating a training image feature space comprising a hyper-sphere with a spherical boundary, wherein a dimension of the training image feature space is determined by a dimension of the training image features and the size of the hyper-sphere is defined by its volume in the feature space, wherein the size of the hyper-sphere is adjustably modified so that the training image feature vector of the at least one cell with "good" segmentation is inside or on the boundary of the hyper-sphere;

obtaining specimen image feature data where the biological specimen is at least one segmentation marker stained test cell from the marker stained biological specimen, including
  positioning the at least one segmentation marker stained test cell on the stage;
  illuminating the at least one segmentation marker stained test cell using the illumination source;
  detecting the light reflected or emitted from the at least one segmentation marker stained test cell using the detector system; and
  converting the detected the light reflected or emitted from the at least one segmentation marker stained test cell to the specimen image feature data by the data analysis system;
  selecting test image features and extracting test image feature data for a test cell stained with at least one segmentation markers in the marker stained biological specimen, wherein the test image features are selected to be the same as the training image features, and the test cell has a test image feature vector defined by the test image features;
  applying the hyper-sphere to the test image feature vector and determining whether the test image feature vector of the at least one test cell is on the boundary of, inside or outside the hyper-sphere of the training image feature space, the test image feature vector being on the boundary of or inside the hyper-sphere indicating that the at least one test cell includes "good" segmentation and the test image feature vector being outside the hyper-sphere indicating that the at least one segmentation marker stained test cell includes "poor" segmentation.

15. The method of claim 14, wherein the step of obtaining training image feature data for a plurality of segmentation marker stained training cells includes:
  staining a training specimen including the plurality of training cells with a first segmentation marker to form a first segmentation marker stained training specimen;
  positioning the first segmentation marker stained training specimen on the stage;
  acquiring an image of the first segmentation marker stained training specimen;
  bleaching the first segmentation marker stained training specimen to form a first bleached training specimen;
  positioning the first bleached training specimen on the stage;
  acquiring an image of the first bleached training specimen;
  staining the first bleached training specimen with a second segmentation marker to form a second segmentation marker stained training specimen, wherein the second segmentation marker is different from the first segmentation marker;
  positioning the second segmentation marker stained training specimen on the stage;
  acquiring an image of the second segmentation marker stained training specimen;
  bleaching the second segmentation marker stained training specimen to form a second bleached training specimen;
  positioning the second bleached training specimen on the stage;
  acquiring an image of the second bleached training specimen;
  staining the second bleached training specimen with a third segmentation marker to form a third segmentation marker stained training specimen, wherein the third segmentation marker is different from the first segmentation marker and the second segmentation marker;
  positioning the third segmentation marker stained training specimen on the stage; and
  acquiring an image of the third segmentation marker stained training specimen.

16. The method of claim 15, wherein the first segmentation marker, the second segmentation marker and the third segmentation marker include a cytoplasm segmentation marker, a membrane segmentation marker or a nuclei segmentation marker.

17. The method of claim 14, wherein the steps of obtaining test image feature data for the at least one segmentation marker stained test cell includes:
  staining a test specimen including the at least one segmentation marker stained test cell with a first segmentation marker to form a first segmentation marker stained test specimen;
  positioning the first segmentation marker stained test specimen on the stage;
  acquiring an image of the first segmentation marker stained test specimen;
  bleaching the first segmentation marker stained training specimen to form a first bleached test specimen;
  positioning the first bleached test specimen on the stage;
  acquiring an image of the first bleached test specimen;
  staining the first bleached test specimen with a second segmentation marker to form a second segmentation marker stained test specimen, wherein the second segmentation marker is different from the first segmentation marker;
  positioning the second segmentation marker stained test specimen on the stage;
  acquiring an image of the second segmentation marker stained test specimen;
  bleaching the second segmentation marker stained test specimen to form a second bleached test specimen;
  positioning the second bleached test specimen on the stage;
  acquiring an image of the second bleached test specimen;
  staining the second bleached test specimen with a third segmentation marker to form a third segmentation marker stained test specimen, wherein the third segmentation marker is different from the first segmentation marker and the second segmentation marker;
  positioning the third segmentation marker stained test specimen on the stage; and
  acquiring an image of the third segmentation marker stained test specimen.

18. The method of claim 17, wherein the first segmentation marker, the second segmentation marker and the third segmentation marker each include a cytoplasm segmentation marker, a membrane segmentation marker or a nuclei segmentation marker.

19. The method of claim 14, the test cell is one of a plurality of segmentation marker stained test cells comprising the steps:
  obtaining test image feature data for each cell in the plurality of segmentation marker stained test cells, the test image feature data including a plurality of cell features for each cell in the plurality of segmentation marker stained test cells;
  isolating the test image feature data for each cell in the plurality of test cells;
  creating a test image feature vector from the test image feature data for each cell in the plurality of test cells, the number of dimensions of the test image feature vector for each cell in the plurality of test cells depending on the number of cell features in the plurality of cell features for each cell in the plurality of test cells, wherein the cell features for each cell in the plurality of test cells are the same; and determining whether the test image feature vector for each cell in the plurality of test cells is on the boundary of, inside or outside the hyper-sphere of the training model, the test image feature vector being on the boundary of or inside the hyper-sphere indicating that the at least one test cell includes "good" segmentation and the test image feature vector being outside the hyper-sphere indicating that the at least one test cell include "poor" segmentation.

20. The method of claim 19, further including determining a cell segmentation quality score ($S_c$) for the image including a plurality of test cells, wherein $$S_c = 10 \times \left( w \times \frac{\int S_g}{\int S_a} + (1-w) \times \frac{|S_g|}{|S_a|} \right),$$

w is a weighting factor where $0 \leq w \leq 1$, $\int S_a$ is the total cell area of the cells included in the plurality of test cells, $\int S_g$ is the total cell area of the cells determined to include "good" segmentation in the plurality of test cells, $|S_g|$ is the total number of cells that are "good" segmented cells in the plurality of test cells and $|S_a|$ is the total number of all cells in the plurality of test cells.

\* \* \* \* \*